(12) United States Patent
Antani et al.

(10) Patent No.: US 9,760,405 B2
(45) Date of Patent: Sep. 12, 2017

(54) DEFINING ENFORCING AND GOVERNING PERFORMANCE GOALS OF A DISTRIBUTED CACHING INFRASTRUCTURE

(75) Inventors: Snehal S. Antani, Poughkeepsie, NY (US); Erik J. Burckart, Durham, NC (US); Rohit D. Kelapure, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2077 days.

(21) Appl. No.: 12/605,136

(22) Filed: Oct. 23, 2009

(65) Prior Publication Data

US 2011/0099265 A1 Apr. 28, 2011

(51) Int. Cl.
G06F 15/16 (2006.01)
G06F 9/50 (2006.01)

(52) U.S. Cl.
CPC .................. *G06F 9/5016* (2013.01)

(58) Field of Classification Search
CPC ............. H04L 67/1012; H04L 41/0893; G06F 17/30902; G06F 2212/284
USPC ................................................. 709/224, 223
See application file for complete search history.

(56) References Cited

U.S. PATENT DOCUMENTS

| 2002/0049608 A1* | 4/2002 | Hartsell et al. ................... 705/1 |
| 2003/0210694 A1* | 11/2003 | Jayaraman et al. .......... 370/392 |
| 2006/0133418 A1* | 6/2006 | Anand .......................... 370/468 |
| 2006/0253461 A1* | 11/2006 | de Bonet ........................ 707/10 |
| 2008/0037532 A1* | 2/2008 | Sykes .................. H04L 41/147 370/389 |
| 2008/0228864 A1* | 9/2008 | Plamondon ................... 709/203 |

OTHER PUBLICATIONS

David Chappell; "SOA and eXtreme Transaction Processing (XTP)"; http://soa.sys-con.com/node/506149; published Feb. 26, 2008.
"Extreme Transaction Processing (XTP)"; http://www.gigaspaces.com/xtp; last visited Apr. 7, 2009.
"Scaling the N-Tier Architecture"; Sun Microsystems, Inc.; Sep. 2000.

* cited by examiner

*Primary Examiner* — Wing F Chan
*Assistant Examiner* — Andrew Woo
(74) *Attorney, Agent, or Firm* — Steven M. Greenberg, Esq.; CRGO Law

(57) ABSTRACT

Embodiments of the present invention provide a method, system and computer program product for enforcing performance goals in an n-Tier distributed caching infrastructure. In an embodiment of the invention, a method of enforcing performance goals in an n-Tier distributed caching infrastructure can include establishing a communicative connection to multiple different cache servers arranged in respective tier nodes in an n-Tier cache. The method also can include collecting performance metrics for each of the cache servers in the respective tier nodes of the n-Tier cache and identifying a cache server amongst the cache servers in respective tier nodes of the n-Tier demonstrating a performance likely to breach at least one term of an SLA. Finally, the method can include applying a remedial measure to the identified cache server.

9 Claims, 2 Drawing Sheets

DEFINING ENFORCING AND GOVERNING PERFORMANCE GOALS OF A DISTRIBUTED CACHING INFRASTRUCTURE

BACKGROUND OF THE INVENTION

Field of the Invention

The present invention relates to the field of service level agreement enforcement and more particularly to service level agreement enforcement in a distributed caching infrastructure.

Description of the Related Art

In an efficient admissions control and capacity planning policy, minimal resources can be allocated automatically to satisfy the requirements of a specified service level agreement (SLA), leaving the remaining resources for later use. An SLA is an agreement between a computing service provider and a computing service consumer that specifies a minimum level of service to be provided by the service provider on behalf of the consumer. The typical SLA includes one or more network traffic terms that either limit the amount and type of resources that the subscribing customer can consume for a given rate, or guarantee the amount and quality of service (QoS) of resources that the provider will provide to the subscribing customer for a given rate.

For example, a subscribing consumer can agree to an SLA in which the consumer agrees to consume only a particular quantity of network bandwidth offered by the provider. Conversely, the SLA can require the provider to guarantee access to the subscribing consumer to at least a minimum amount of bandwidth. Also, the SLA can require the provider to provide a certain QoS over the provided minimum amount of bandwidth.

When considering the terms of an SLA, content and application hosts provision server resources for their subscribing customers, co-hosted server applications or services, according to the resource demands of the customers at their expected loads. Since outsourced hosting can be viewed as a competitive industry sector, content and application hosts must manage their resources efficiently. Logically, to ensure that the customers receive the promised level of service in the SLA, content and application hosts can be configured to survive a worst-case load. Yet, the worst-case approach can unnecessarily tax the resources of the content host or the application host as the case may be, even when those resources are not required to service a given load. Hence, rather than over-provisioning resources, efficient admission control and capacity planning policies can be designed merely to limit rather than eliminate the risk of meeting the worst-case demand.

While SLA management and enforcement has become part and parcel of ordinary application hosting relationships between consumer and host, Extreme Transaction Processing (XTP) provides new challenges in the use and enforcement of the SLA. XTP is a technology used by application hosts to handle exceptionally large numbers of concurrent requests. Serving such a large volume of concurrent requests can be made possible in XTP by distributing the load resulting from the concurrent requests on computer clusters or whole grid computing networks. Further, general XTP supporting architectures often rely upon aggressive caching across an n-Tier caching infrastructure (a multi-tiered cache structure), affinity routing (the intelligent routing of a request to business logic executing nearest to the requisite data consumed by the business logic), and decreasing data-access latency via the "MapReduce" framework commonly used to support distributed computing on large data sets on clusters of computers. Thus, in an XTP supporting architecture it can be critical to monitor the performance of the n-Tier cache and to adjust the configuration of the n-Tier cache in order to meet the terms of a corresponding SLA for each customer.

BRIEF SUMMARY OF THE INVENTION

Embodiments of the present invention address deficiencies of the art in respect to performance management in an n-Tier caching architecture and provide a novel and non-obvious method, system and computer program product for enforcing performance goals in an n-Tier distributed caching infrastructure. In an embodiment of the invention, a method of enforcing performance goals in an n-Tier distributed caching infrastructure can include establishing a communicative connection to multiple different cache servers arranged in respective tier nodes in an n-Tier cache. The method also can include collecting performance metrics for each of the cache servers in the respective tier nodes of the n-Tier cache and identifying a cache server amongst the cache servers in respective tier nodes of the n-Tier demonstrating a performance likely to breach at least one term of an SLA.

Finally, the method can include applying a remedial measure to the identified cache server. For example, the remedial measure can include establishing request affinity between specified requests and the identified cache server. As another example, the remedial measure can include increasing a cache size of the identified cache server. As yet another example, the remedial measure can include allocating additional central processing unit (CPU) cycles for the identified cache server.

In another embodiment of the invention, a data processing system can be configured with an n-Tier cache. The system can include different cache servers in respective tier nodes arranged in an n-Tier cache. The system also can include an application server with processor and memory configured to host execution of application logic and coupled to the n-Tier cache. Even yet further, the system can include a cache server with processor and memory providing access to the n-Tier cache. Finally, the system can include a cache policy enforcement module coupled to the n-Tier cache. The module can include computer usable program code executable in the memory of the cache server by the processor of the cache server. Additionally, the computer usable program code when executed can establish a communicative connection to the cache servers, collect performance metrics for each of the cache servers, identify a cache server amongst the cache servers demonstrating a performance likely to breach at least one term of an SLA, and apply a remedial measure to the identified cache server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for enforcing performance goals in an n-Tier distributed caching infrastructure. In accordance with an embodiment of the present invention, performance objectives for the cache servers of an n-Tier cache can be established in order to ensure the terms of one or more SLAs. The performance of the server caches in the n-Tier cache can be monitored so that metrics are collected for each of the server caches in respect to the performance of each of the server caches. When it is determined that the metrics of any of the server caches falls short of the performance objectives, remedial measures can be applied to each offending server cache in order to ensure that the offending server caches do not give rise to a breach of one or more of the terms of the SLAs.

Figure 1:
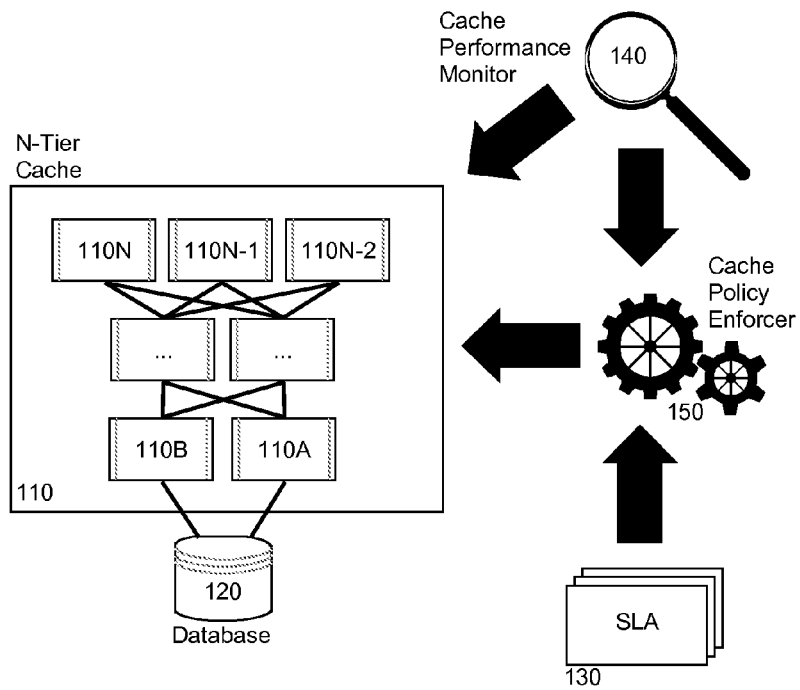
FIG. 1 is a pictorial illustration of a process for enforcing performance goals in an n-Tier distributed caching infrastructure.

In illustration, FIG. 1 pictorially depicts a process for enforcing performance goals in an n-Tier distributed caching infrastructure. As shown in FIG. 1, an n-Tier cache 110 can be configured to include multiple different tiers of server caches 110A . . . 110N-1 for data stored in a database 120. Performance goals for the n-Tier cache 110 can be established within terms of one or more SLAs 130. A cache performance monitor 140 can monitor the performance of the n-Tier cache 110 in the context, by way of example, of retrieval times for retrieval requests from the different server caches 110A . . . 110N-1 in the n-Tier cache 110. When the measured performance is determined to likely cause a breach in one or more terms of an SLA 130, cache policy enforcer 150 can apply corrective action to one or more of the server caches 110A . . . 110N-1, for instance by establishing server affinity for specified data or a specified query in respect to an offending one of the server caches 110A . . . 110N-1, by increasing the cache size of an offending one of the server caches 110A . . . 110N-1, by allocating additional CPU cycles to an offending one of the server caches 110A . . . 110N-1, to name only a few remedial measures.

Figure 2:
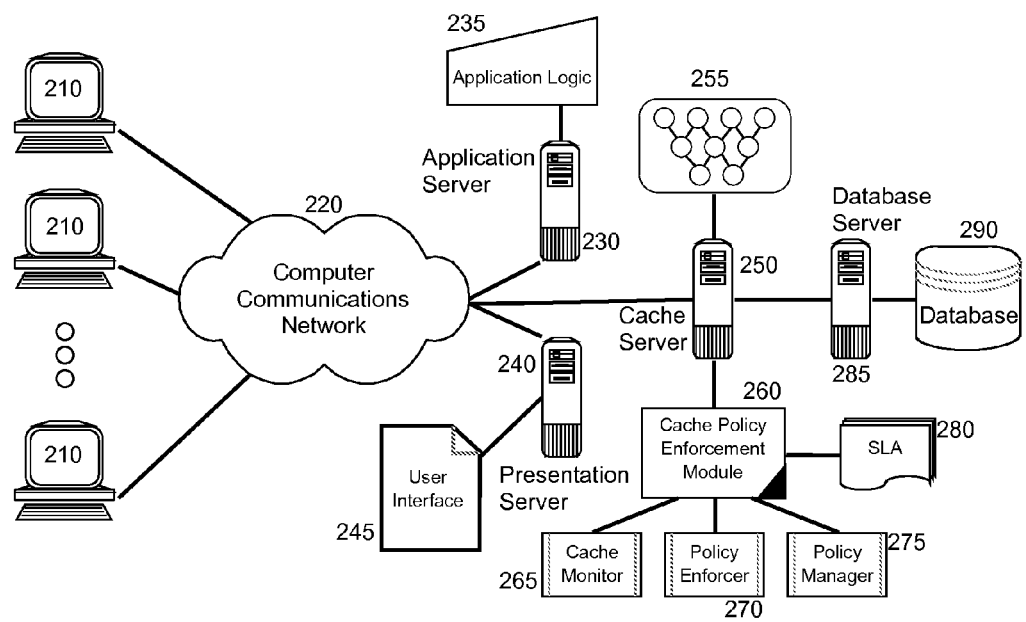
FIG. 2 is a schematic illustration of a computer data processing system arranged with an n-Tier distributed caching infrastructure; and, FIG. 3 is a flow chart illustrating a process for enforcing performance goals in an n-Tier distributed caching infrastructure.

In further illustration, FIG. 2 is a schematic illustration of a computer data processing system arranged with an n-Tier distributed caching infrastructure. The system can include an application server 230 with processor and memory hosting the execution of application logic 235 for use by coupled clients 210 over computer communications network 220. A presentation server 240, also with processor and memory, further can be provided, such as a Web server, to provide a user interface 245 for the application logic 235 to the coupled clients 210 so as to provide a mode of access by the coupled clients 210 to the application logic 235 executing in application server 230. Finally, a database server 285 can be communicatively linked to the application server 230 such that data in a companion database 290 can be used and managed by the application logic 235 and accessed through the application logic 235 by the coupled clients 210.

Notably, a cache server 250 can be disposed within the communicative path between the database server 285 and the application server 230. The cache server 250 can provide caching services for data stored in the database 290 as requested by the application logic 235 executing in the application server 230. Further, an n-Tier cache 255 can be managed by the cache server 250 so as to implement an n-Tier caching architecture for data within the database 290 utilized by the application logic 235 in servicing requests from the coupled clients 210 through the user interface 245 provided by the presentation server 240.

In accordance with an embodiment of the present invention, a cache policy enforcement module 260 can be coupled to the cache server 250. The cache policy enforcement module 260 can include computer usable program code loaded from a computer readable medium into the memory of the cache server 250 (or other coupled server) and executed by a processor of the cache server 250 (or other coupled server). The cache policy enforcement module 260 can include each of a cache monitor portion 265, a policy enforcer portion 270 and a policy manager portion 275. Further, the cache policy enforcement module 260 can be configured to access one or more SLAs 280 defining performance objectives for the n-Tier cache 255.

The policy manager portion 275 can include a set of code instructions for execution by a processor for adding, modifying and deleting the performance objectives of the n-Tier cache 255 in order to meet the terms of one or more of the SLAs 280. In this regard, the code instructions of the policy manager portion 275 can provide access by an administrator to establish specific performance objectives of the cache servers of the n-Tier cache 255 such as response time expected of a given cache server in the n-Tier cache 255.

The cache monitor portion 265, in turn, can include a set of code instructions for execution by a processor for monitoring the performance of each of the cache servers in the n-Tier cache 255 such as response time for each of the cache servers. Finally, the policy enforcer portion 270 can include a set of code instructions for execution by a processor for applying remedial measures to an offending one of the cache servers in the n-Tier cache 255 when the offending one of the cache servers in the n-Tier cache 255 is determined to have demonstrated observed performance falling short of the performance objectives specified by the policy manager portion 275 and likely to result in a breach of one or more of the terms of the SLAs 280. Those remedial measures can include, by way of example, establishing server affinity for specified data or a specified query in respect to an offending one of the server caches, increasing the cache size of an offending one of the server caches, and allocating additional CPU cycles to an offending one of the server caches, to name only a few remedial measures.

Figure 3:
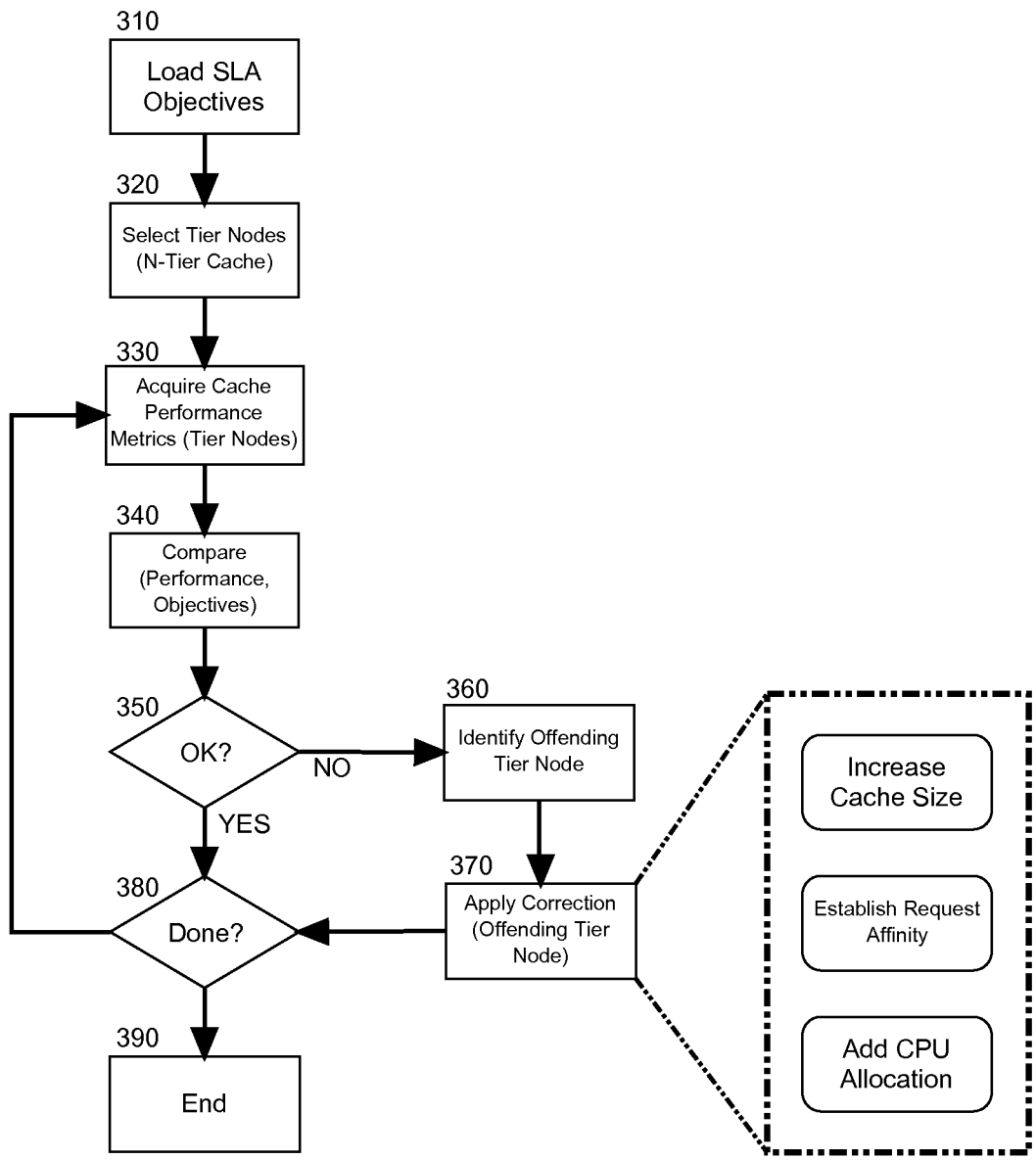

In yet further illustration of the operation of the computer usable program code of the cache policy enforcement module 260, FIG. 3 is a flow chart illustrating a process for enforcing performance goals in an n-Tier distributed caching infrastructure. Beginning in block 310, one or more SLA objectives can be loaded into memory from a stored set of SLA objectives. In block 320, different tier nodes in an n-Tier cache, each representative of a cache server, can be selected for performance monitoring and in block 330, the performance of each of the cache servers for each tier node can be monitored through the acquisition of performance metrics. Exemplary performance metrics include hit ratio (the number of requests that hit in the cache as a percentage of total requests), byte hit ratio (the number of bytes that hit in the cache as the percentage of the total number of bytes requested), latency reduction (the percentage of the sum of downloading latency for the data hit in cache over the sum of all downloading latencies), hop reduction (the ratio between the total number of the hops of cache hits and the total number of the hops of all accesses), and weighted-hop reduction (the corresponding ratio for the total number of hops times "packet savings" on cache hits)

In block 340, the measured performance metrics of each of the cache servers in each of the tier nodes can be compared to the loaded SLA objectives—for example by reference to a table of required performance metrics relative to loaded SLA objectives in order to determine whether any of the measured performance metrics is likely to give rise to a breach in any of the loaded SLA objectives. In decision block 350, if it is determined that any of the measured performance metrics is likely to give rise to a breach in any of the loaded SLA objectives, in block 360 the offending tier node can be identified and in block 370, one or more corrective, remedial actions can be applied to the identified offending tier node.

For example, the cache size of the cache server in the offending tier node can be increased, request affinity can be established between the cache server of the offending tier node in the n-Tier cache and particular requests associated with an SLA likely to be breached in view of the observed performance metrics of the offending tier node, or additional CPU cycles can be allocated to the offending tier node. In any event, once remedial measures have been applied to the offending tier node in block 370, in decision block 380 it can be determined whether or not to continue to monitor the performance of the n-Tier cache. If so, the process can return to block 330. Otherwise, in block 390 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method of enforcing performance goals in an n-Tier distributed caching infrastructure, the method comprising:

loading into memory of a computer, one or more service level agreement (SLA) objectives from a table of SLA objectives;

establishing a communicative connection to a plurality of cache servers arranged in respective tier nodes in an n-Tier cache and disposed within a communicative path between a database server and an application server, the plurality of cache servers providing caching services for data stored in a database managed by the database server as requested by application logic executing in the application server;

collecting performance metrics for each of the cache servers in the respective tier nodes of the n-Tier cache, the performance metrics comprising retrieval times for retrieval of requests from the different cache servers in the tier nodes of the n-Tier cache;

identifying a cache server amongst the cache servers in respective tier nodes of the n-Tier demonstrating a performance likely to breach at least one term of an SLA; and applying a remedial measure to the identified cache server by establishing request affinity between specified requests and the identified cache server.

2. The method of claim 1, wherein applying the remedial measure to the identified cache server further comprises increasing a cache size of the identified cache server.

3. The method of claim 1, wherein applying the remedial measure to the identified cache server further comprises allocating additional central processing unit (CPU) cycles for the identified cache server.

4. A data processing system configured with an n-Tier cache, the system comprising:

a plurality of cache servers in respective tier nodes arranged in an n-Tier cache and disposed within a communicative path between a database server and an application server, the plurality of cache servers providing caching services for data stored in a database managed by the database server as requested by application logic executing in the application server;

a cache server with processor and memory providing access to the n-Tier cache; and a cache policy enforcement module coupled to the n-Tier cache, the module comprising computer usable program code executable in the memory of the cache server by the processor of the cache server, the computer usable program code when executed loading into the memory, one or more service level agreement (SLA) objectives from a table of SLA objectives, establishing a communicative connection to the cache servers, collecting performance metrics for each of the cache servers, the performance metrics comprising retrieval times for retrieval of requests from the different cache servers in the tier nodes of the n-Tier cache, identifying a cache server amongst the cache servers demonstrating a performance likely to breach at least one term of a service level agreement (SLA), and applying a remedial measure to the identified cache server by establishing request affinity between specified requests and the identified cache server.

5. The system of claim 4, wherein the remedial measure further comprises an increase in cache size of the identified cache server.

6. The system of claim 4, wherein the remedial measure further comprises an allocation of additional central processing unit (CPU) cycles for the identified cache server.

7. A computer program product comprising a computer usable storage medium comprising a memory device storing computer usable program code for enforcing performance goals in an n-Tier distributed caching infrastructure, the computer program product comprising:

computer usable program code for loading into memory of a computer, one or more service level agreement (SLA) objectives from a table of SLA objectives;

computer usable program code for establishing a communicative connection to a plurality of cache servers arranged in respective tier nodes in an n-Tier cache and disposed within a communicative path between a database server and an application server, the plurality of cache servers providing caching services for data stored in a database managed by the database server as requested by application logic executing in the application server;

computer usable program code for collecting performance metrics for each of the cache servers in the respective tier nodes of the n-Tier cache;

computer usable program code for identifying a cache server amongst the cache servers in respective tier nodes of the n-Tier demonstrating a performance likely to breach at least one term of an SLA; and computer usable program code for applying a remedial measure to the identified cache server by establishing request affinity between specified requests and the identified cache server.

8. The computer program product of claim 7, wherein the computer usable program code for applying the remedial measure to the identified cache server further comprises computer usable program code for increasing a cache size of the identified cache server.

9. The computer program product of claim 7, wherein the computer usable program code for applying the remedial measure to the identified cache server further comprises computer usable program code for allocating additional central processing unit (CPU) cycles for the identified cache server.

* * * * *